United States Patent [19]

Sweeney et al.

[11] Patent Number: 5,044,852

[45] Date of Patent: Sep. 3, 1991

[54] VACUUM FIXED ADHESIVELY SECURED FASTENER

[75] Inventors: Theodore J. Sweeney, Grosse Pointe City, Mich.; Englebert A. Meyer, Sun City, Calif.

[73] Assignee: Theodore Sweeney & Company, Inc., Detroit, Mich.

[21] Appl. No.: 571,573

[22] PCT Filed: Feb. 18, 1988

[86] PCT No.: PCT/US88/00499

§ 371 Date: Sep. 4, 1990

§ 102(e) Date: Sep. 4, 1990

[87] PCT Pub. No.: WO89/07718

PCT Pub. Date: Aug. 24, 1989

Related U.S. Application Data

[60] Continuation-in-part of Ser. No. 86,363, Aug. 17, 1987, Pat. No. 4,830,558, which is a division of Ser. No. 800,555, Nov. 21, 1985, Pat. No. 4,693,652, which is a continuation of Ser. No. 472,084, Mar. 4, 1983, Pat. No. 4,555,206, which is a division of Ser. No. 234,777, Feb. 11, 1981, Pat. No. 4,425,065, which is a division of Ser. No. 936,331, Aug. 24, 1978, abandoned.

[51] Int. Cl.⁵ .................... F16B 39/00; F16B 37/06
[52] U.S. Cl. ........................ 411/258; 411/82; 248/205.3
[58] Field of Search .............. 411/69, 82, 171, 258, 411/23, 965; 405/260, 261; 156/71, 242, 295; 248/205.3

[56] References Cited

U.S. PATENT DOCUMENTS

| Re. 16,062 | 5/1925 | Tomkinson | 411/73 |
|---|---|---|---|
| 2,092,341 | 9/1937 | de Vries | 411/23 |
| 2,268,520 | 12/1941 | Wesley | 411/171 |
| 2,451,194 | 10/1948 | Braun | 248/205.3 |
| 2,557,434 | 6/1951 | Hoverder . | |
| 3,044,340 | 7/1962 | Luhm | 411/60 |
| 3,061,455 | 10/1962 | Anthony | 411/258 |
| 3,108,443 | 10/1963 | Schuermann | 405/261 |
| 3,240,379 | 3/1966 | Bremer et al. | 411/82 |
| 3,311,012 | 3/1967 | Williams | 405/260 |
| 3,469,490 | 9/1969 | Pearce, Jr. | 411/371 |
| 3,472,301 | 10/1969 | Pearce, Jr. | 411/371 |
| 3,489,599 | 1/1970 | Krieble | 411/258 |
| 3,532,316 | 10/1970 | Mathes | 156/242 |
| 3,704,264 | 11/1972 | Gorman | 411/965 |
| 3,719,792 | 3/1973 | Cuccaro . | |
| 3,757,828 | 9/1973 | Frauenglass | 411/258 |
| 3,880,535 | 4/1975 | Durham et al. | 411/116 |
| 3,922,449 | 11/1975 | Bolger | 411/82 |
| 4,076,774 | 2/1978 | Short . | |
| 4,094,222 | 6/1978 | Lang et al. | 411/15 |
| 4,224,971 | 9/1980 | Muller et al. | 411/360 |
| 4,389,035 | 6/1983 | Freeman | 248/205.3 |

FOREIGN PATENT DOCUMENTS

| 198005 | 6/1958 | Austria | 405/261 |
|---|---|---|---|
| 701599 | 1/1965 | Canada | 411/258 |
| 1232538 | 1/1967 | Fed. Rep. of Germany | 405/261 |
| 1500720 | 5/1969 | Fed. Rep. of Germany . | |
| 1950800 | 4/1971 | Fed. Rep. of Germany | 411/69 |
| 2240017 | 2/1974 | Fed. Rep. of Germany | 411/171 |

*Primary Examiner*—Neill R. Wilson
*Attorney, Agent, or Firm*—Brooks & Kushman

[57] ABSTRACT

A vacuum fixed adhesively secured fastener comprises a body member (24) having a vacuum cup (26) for flattening against a substrate (22) to temporarily hold the body member (24) against the substrate (22). A reservoir (32) is adapted to contain a quick setting adhesive (30) which is expelled from the reservoir into the interface (28) between the substrate (22) and the body member as a plunger (45) displaced into the reservoir during flattening of the vacuum cup. The quick setting adhesive secures the body member (24) to the substrate (22).

17 Claims, 2 Drawing Sheets

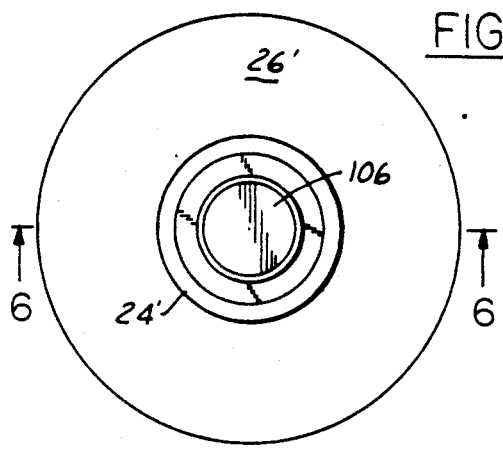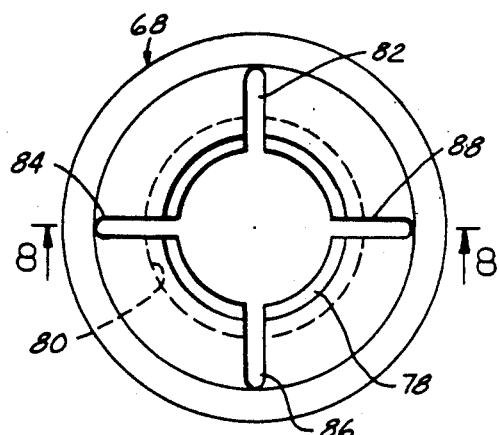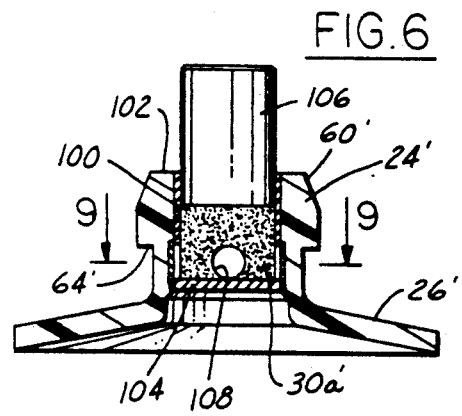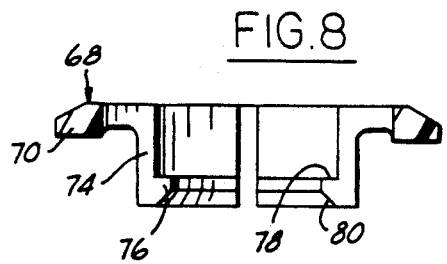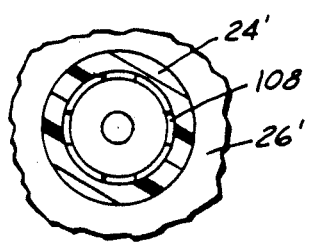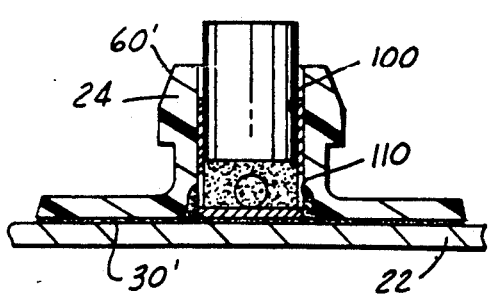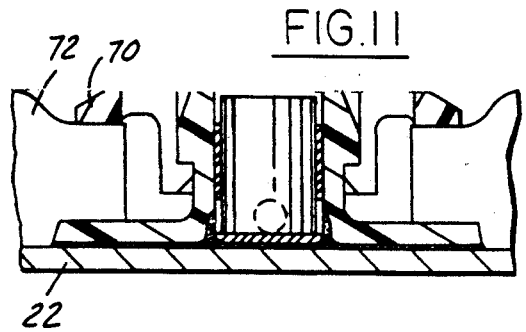

VACUUM FIXED ADHESIVELY SECURED FASTENER

CROSS-REFERENCE TO RELATED CASES

This case is a continuation-in-part of U.S. application, Ser. No. 07/086,363 filed Aug. 17, 1987, now U.S. Pat. No. 4,830,558, which is a division of application, Ser. No. 800,555 filed Nov. 21, 1985 now U.S. Pat. No. 4,693,652 dated Sept. 15, 1987 which was a continuation of U.S. application, Ser. No. 472,084 filed Mar. 4, 1983, now U.S. Pat. No. 4,555,206 dated Nov. 26, 1985 which was a division of U.S. application, Ser. No. 234,777 filed Feb. 11, 1981, now U.S. Pat. No. 4,425,065 which was a division of U.S. application, Ser. No. 936,331 filed Aug. 24, 1978 now abandoned, all of which are hereby incorporated by reference.

FIELD OF THE INVENTION

This invention relates to adhesively secured fasteners, such as fasteners which may be adhesively secured to a substrate and thereafter utilized to secure another part or parts to the substrate.

BACKGROUND OF THE INVENTION

With the advent of quick setting adhesives, such as adhesives which will cure from a liquid to a solid phase in but a few seconds, increasing attention has been given to utilization of such adhesives in the automotive industry for the attachment of trim or other components to automobile bodies. In a production environment where the body is moving on a conveyor line, and the parts to be secured are brought to the moving body and but a few moments are available for securing the parts to the body, a problem has arisen as to how to hold the fasteners to the parts or the automobile body, as the case may be, while the quick setting adhesive goes from its liquid phase to its solid phase, i.e., changes state sufficiently so that a fastener will be retained Heretofore it has been common practice to secure parts together using adhesives by clamping them for a sufficient length of time that the adhesive could cure or set. On large or irregularly shaped automotive body panel, clamping the fasteners thereagainst involves a cumbersome inefficient production step best avoided. While fasteners may be temporally secured to the substrate by piercing the substrate and having a portion of the fastener extend through the resulting hole to temporarily lock the fastener to the substrate while adhesive thereon sets, such as shown in the above mentioned related cases, the resulting perforations of the substrate create serious corrosion and other problems. Accordingly, it is desirable to be able to avoid the necessity of clamping fasteners against a body panel without resort to external devices and yet not effect the clamping by virtue of piercing the panel.

Another problem confronting the fastener designs is the retention of the adhesive in a non-reactive state within or on the fastener and providing some way that the adhesive can be suddenly made reactive and be deposited at the point of intended use.

SUMMARY OF THE INVENTION

We have disclosed a fastener utilizing a quick setting adhesive which may be temporarily fixed against a substrate without piercing the same and without the necessity of extraneous clamps to hold the fastener against the substrate while the adhesive sets. We accomplish this by providing the fastener with a vacuum cup. The fastener is also provided with an adhesive reservoir containing the quick setting adhesive. In use, the fastener is pressed against the substrate to flatten the vacuum cup and temporary affix the fastener to the substrate. Simultaneously, the adhesive reservoir is actuated to expel adhesive therefrom into the interface between the fastener body and the substrate. Upon setting of the adhesive, the fastener is securely and permanently attached to the substrate.

The construction of the fastener is such that the adhesive is contained within an adhesive reservoir within the fastener so that the fastener may be handled without contaminating the workman or the apparatus prior to actual use of the fastener. Two similar yet different approaches to the design of a fastener embodying the invention is disclosed.

The fastener body which is to be adhesively secured to a substrate is formed of a material to which the adhesive will adhere, while the reservoir and means for controlling egress of adhesive therefrom is formed of a material to which the adhesive either will not adhere or will not cause the adhesive to set up while stored therein or in contact therewith.

BRIEF DESCRIPTION OF THE DRAWINGS

FIG. 5 is a plan view of a second embodiment of a fastener incorporating the invention;

FIG. 6 is a cross-sectional view taken on the line 6—6 of FIG. 5;

FIG. 7 is a plan view of a female fastener element for use with the fastener shown in FIGS. 1 and 2 or 5 and 6;

FIG. 8 is a cross-sectional view through the fastener element of FIG. 7 taken on the line 8—8;

FIG. 9 is a cross-sectional view taken on the line 9—9 of FIG. 6.

FIG. 10 is a cross-sectional view similar to FIG. 6 showing the fastener flattened against a substrate; and FIG. 11 is a view similar to FIG. 10 showing the fastener element of FIGS. 7 and 8 attached to the fastener shown in FIGS. 5 and 6 and retaining a part to the substrate.

BRIEF DESCRIPTION OF THE PREFERRED EMBODIMENTS

Figure 1:
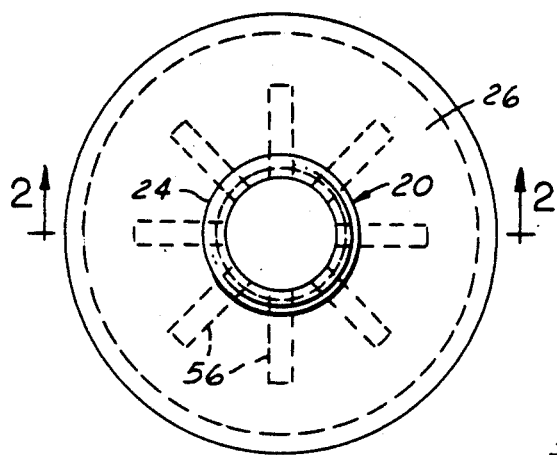
FIG. 1 is a top plan view of a first embodiment of the fastener.
Figure 2:
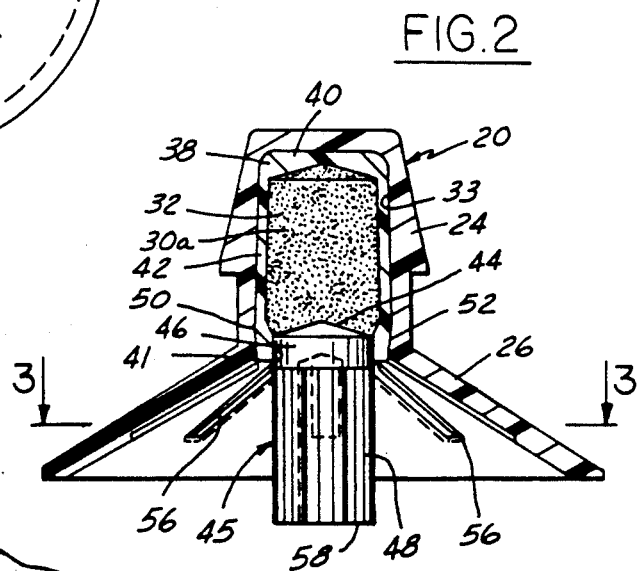
FIG. 2 is a cross-sectional view taken on line 2—2 of FIG. 1.
Figure 3:
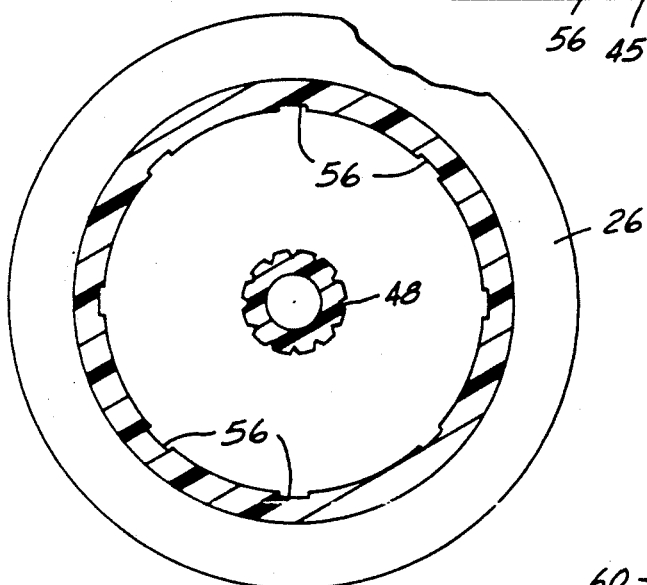
FIG. 3 is a cross-sectional view taken substantially on the line 3—3 of FIG. 2.
Figure 4:
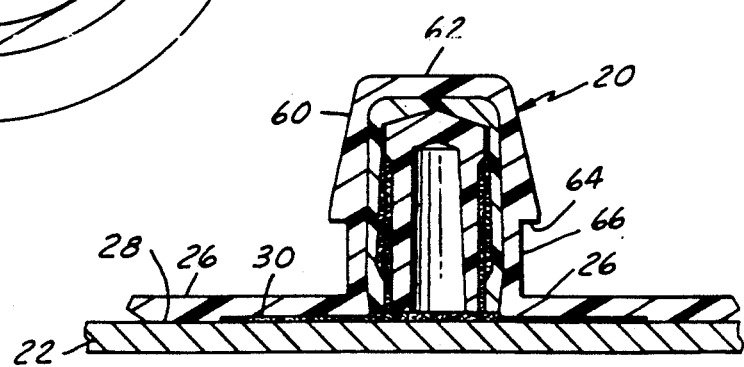
FIG. 4 is a cross-sectional view similar to FIG. 2 but showing the fastener applied to a substrate with vacuum cup flattened thereagainst.

The invention herein disclosed is shown in two embodiments, the first being shown in FIGS. 1-4 inclusive and the second in FIGS. 5, 6 and 9-11. These two embodiments are generally similar though they differ somewhat in design and construction. The embodiment shown in FIGS. 1-4 inclusive will be described first and comprises a vacuum fixed adhesively secured fastener 20 for attachment to a substrate 22. The fastener includes a body member 24 having a vacuum cup 26 thereon for flattening against the substrate 22 to temporarily hold the body member thereto. As best shown in FIG. 4, the vacuum cup 26 and the substrate 22 define therebetween an interface 28 into which a quick setting adhesive 30 is inserted, as hereinafter described, for permanently securing the body member to the substrate.

The body member 24 contains a reservoir 32 for holding a quick setting adhesive 30a as best shown in FIG. 2. In this embodiment the reservoir is defined by a chamber member 38 of generally cylindrical configuration closed by an end wall 40 and provided with an encircling cylindrical side wall 42. The chamber is a press fit within a cylindrical recess or pocket 33 in the body member. The end of the chamber opposite wall 40 is open as at 41 adjacent the interior of the vacuum cup. Such end of the chamber is closed by a wall portion 44 which is displaceable inwardly of the chamber as hereinafter described.

The inwardly displaceable wall 44 in the embodiment of FIGS. 1-4 comprises a plunger member 45 having a circumferential land 46 which in a first position of the plunger shown in FIG. 2 blocks egress of the adhesive 30a from the chamber 38. The plunger is provided, as best shown in FIG. 2 and 3, with one or more adhesive exit passages 48 (12 such being shown in FIG. 3). Such passages serve to permit egress of the adhesive 30a within the chamber 38 upon displacement of the plunger from the first position shown in FIG. 2 to a second position shown in FIG. 4. When the land 46 passes through the opening 41 the passages 48 are then exposed to the adhesive 30a within the chamber and the pressure created on the adhesive as the plunger is moved thereagainst causes the adhesive to be expelled along the passages 48 into the interface 28 between the vacuum cup and the substrate 22.

In the form shown, the chamber 38 is provided with a beveled surface 50 surrounding its open end. The entrance 52 to the pocket 33 in the fastener body 24 is also tapered to match the taper 50. The chamber 38 with its plunger 45 inserted therein such that the land 46 locks the escape of adhesive 30a is pressed into the pocket 33 in the body member to the position shown in FIG. 2 at which the tapers 50 and 52 will cooperate to retain the chamber within the body member.

The fastener body 24 should be fabricated from a resilient plastic to permit the expansion of the body member adjacent the opening 52 to permit longitudinal introduction of the chamber 38 thereinto and the consequent clamping by the body at its taper 52 against the corresponding taper 50 of the chamber 38. In addition, if the body member and vacuum cup are to be made of the same material, the plastic material of which the body member is formed should be sufficiently resilient as to provide for the vacuum cup 26 which must be capable of flattening against the substrate 22 from the position shown in FIG. 2 to that shown in FIG. 4. The body member 24 may be formed of a vinyl plastic having a hardness of Shore A75 plus or minus 2. The plastic selected must be of the type to which the adhesive will adhere when allowed to come into contact therewith. Other suitable plastic may also be used.

The plunger 45 and chamber 38 on the other hand should be formed of polypropylene, or any other plastic to which the adhesive will either not adhere or will not cause the adhesive to begin to set up. Thus the material of the reservoir and plunger will be different than the material of the fastener body, and the adhesive is effectively isolated from the fastener body until the adhesive is expelled from the container into contact with the fastener body.

To insure uniform distribution of the adhesive as it moves from the reservoir into the interface 28, distributing means are provided comprising a plurality of grooves 56 formed on the underside of the vacuum cup and extending from a point adjacent the opening at the end of the chamber opposite the wall 40 to a point substantially ⅔ of the length of the vacuum cup skirt. The length and number of these grooves may be varied in accordance with the designer's requirement. The grooves serve to provide adhesive flow passageways in the interface when the vacuum cup is flattened against the substrate 22 so that the adhesive is substantially uniformly delivered throughout the interface.

The adhesive is expelled from the adhesive reservoir by virtue of the end 58 of the plunger butting the substrate 22 as the fastener body 24 is urged toward the substrate to flatten the vacuum cup 26. In the embodiment shown there is sufficient resilience in the chamber 38 and body member 24 and/or sufficient air space within the chamber above adhesive 30a so that the plunger may be displaced into the chamber sufficiently to expose the upper ends of the passages 48 to the adhesive. Once the passages 48 are exposed to the adhesive, the same is expelled along the passages and into the interface as aforesaid during continued flattening of the vacuum cup until the parts have reached the position shown in FIG. 4 where the plunger is fully inserted into the chamber and the adhesive has been substantially completely expelled and is disposed within the passages 48, the grooves 56 and spread throughout the interface 28.

The body member 24 may desirably be shaped to facilitate securement of a part to be fastened to the substrate. As one design, though any number may occur to the fastener designer, the body member may be provided with a head having a tapered surface 60 which expands radially from the top wall 62 to an undercut shoulder 64. The shoulder 64 spaced above the vacuum cup 26 to provide a generally cylindrical area 66. A complimentary female fastener element 68 (see FIGS. 7 and 8) is intended to be snapped down over the head 60 and to result in a coupling similar to that shown in FIG. 11. The female element is generally hat-shaped having a brim portion 70 intended to surround the adhesively secured fastener and abut the part 72 to be held against the substrate 22. The brim 70 is a continuous annulus having a crown portion 74 terminating in an internal lip 76. The lip has a catch surface 78 and a camming wedge surface 80. The crown 74 is desirably slit such as at the four kerfs 82, 84, 86 and 88 which extend from adjacent the brim 70 across the wall thickness of the crown 74. The female element 68 may be formed of any suitable plastic such as a polycarbonate or the like.

The female element 68 is snapped over the fastener body 24 by pressing the female element down over the head. The camming wedge surface 80 will engage the sloping surface of the body member and cause the crown 74 to spread at the kerfs 82, 84, 86 and 88 until the lip 76 snaps beneath the shoulder 64 locking the female element on the head of the fastener body. The brim 70 will bear against the part 72 securing it to the substrate. In the embodiment illustrate in FIG. 11 which is representative of an application for the invention herein disclosed, an insulating matt or the like may represent the part 72 secured to the substrate.

In the second embodiment shown in FIGS. 5, 6, 9-11, the fastener body 24' is provided with a vacuum cup 26'. The body 24' has an internal through aperture 100 opening from the top 102 into the vacuum cup interior at the opposite end. Within the opening 100 is disposed an adhesive reservoir having a displaceable wall. The adhesive reservoir in the illustrated embodiment comprises a cup-shaped chamber 104 closed at one end and open at the opposite end within which is slideably received a plunger 106 comprising the displaceable wall of the reservoir above mentioned. The chamber 104 is provided adjacent its closed end with side opening apertures 108. The chamber is longitudinally shiftable in the body member 24' between a first position shown in FIG. 6 and a second position shown in FIG. 10. In the FIG. 6 position the side opening ports 108 are blocked by the encircling wall of the body member 24' while in the position shown in FIG. 10 the ports are unblocked so that adhesive in the chamber 104 may be expelled into the vacuum cup and specifically the interface between the vacuum cup and the substrate 22 as shown at 30'.

In use, the adhesive 30a' is trapped within the chamber 104 so as not to contaminate the workman or the parts. When it is desired to apply the fastener to a substrate, the vacuum cup 26' is placed against the substrate and the plunger 106 is depressed urging it into the chamber 104. This pressurizes the adhesive within the chamber and causes the chamber itself to be displaced toward the substrate. During such displacement, the vacuum cup is flattened against the substrate and at the same time the adhesive 30a' is expelled through the ports 108 and into the interface between the vacuum cup and the substrate. While not shown in this second embodiment, grooves similar to the grooves 56 shown in the first embodiment may be provided in the underside of the vacuum cup's skirt to facilitate distribution of the adhesive throughout the interface. It is will be noted particularly in FIG. 10 that the body member 24' has an enlarged counterbore portion 110 which surrounds the open inner end of the through aperture 100 thereby facilitating expulsion of the adhesive from the reservoir.

The body member 24' may be provided with a head 60' generally similar to that of the first embodiment for cooperation with a female fastener such as element 68 shown in FIGS. 7 and 8.

By way of example, but not by way of limitation, if the adhesive to be used is an anaerobic, 3M Scotch-Grip #2353 manufactured by Minnesota Mining Manufacturer may be used. If the adhesive is a cyanoacrylate, Loctite 414, manufactured by Loctite Corporation, Newington, Conn. may be used. If an epoxy resin is desired, Goodrich E 2102B, E2101A or E2101B manufactured by B.V. Goodrich Chemical Co., Cleveland, Ohio. A suitable urethane adhesive may be purchased from UPACO, Adhesive, Inc. 3 E. Spitbrook Road, Nashua, N.H.

We claim:

1. A vacuum fixed adhesively secured fastener for attachment to a substrate comprising, in combination:
   a body member having a vacuum cup thereon for flattening against a substrate to temporarily hold the body member thereto and defining an interface therebetween;
   a reservoir on the body member for containing a quick setting adhesive;
   plunger means on the body member cooperating with the reservoir for displacement thereinto as the vacuum cup is flattened;
   distributing means for receiving adhesive expelled from the reservoir and distributing it throughout said interface;
   valve means between the reservoir and distributing means and responsive to displacement of the plunger means to allow escape of adhesive from the reservoir to said distributing means; and
   the volume of the reservoir being reduced as the plunger means is displaced thereinto to expel adhesive in the reservoir into the interface between the body member and a substrate against which the vacuum cup is flattened.

2. A vacuum fixed adhesively secured fastener for attachment to a substrate comprising, in combination:
   a body member having a vacuum cup thereon for flattening against a substrate to temporarily hold the body member thereto and defining an interface therebetween;
   said body member having therein an adhesive reservoir for containing a quick setting adhesive;
   said reservoir having a wall portion for inward displacement as the vacuum cup is flattened against a substrate to pressurize adhesive in the reservoir;
   means for receiving adhesive expelled from the reservoir and directing the adhesive in determined paths through said interface;
   said wall portion comprising a plunger having an outwardly disposed end portion to be displaced toward the reservoir as the vacuum cup is flattened against a substrate; and
   valve means for controlling egress of adhesive from the reservoir and responsive to displacement of said wall portion for allowing escape of adhesive into the interface between the vacuum cup and a substrate against which the vacuum cup is flattened.

3. The invention defined in claim 2 characterized by valve means for controlling egress of adhesive from the reservoir into said interface.

4. The invention defined by claim 1 or 2 characterized in that said valve means is responsive to displacement of said plunger means to allow egress of adhesive from the reservoir into the said interface.

5. The invention defined by claim 1 wherein said reservoir is formed of a material which will not cause the adhesive to set up.

6. The invention defined by claim 1 wherein the end of the plunger means disposed to abut the substrate as the vacuum cup is flattened is disposed within the vacuum cup.

7. The invention defined by claim 1 wherein said plunger means is arranged with an end portion exposed for depression in flattening the vacuum cup against a substrate.

8. The invention defined by claim 7 wherein said exposed end portion of the plunger means is disposed for depression at the opposite side of the body member from the vacuum cup.

9. The invention defined by claim 2 wherein said end portion of the plunger is exposed beyond the body member opposite said vacuum cup.

10. A vacuum fixed adhesively secured fastener for attachment to a substrate comprising, in combination:
    a body member having a vacuum cup thereon for flattening against a substrate to temporarily hold the body member thereto and defining an interface therebetween;

a reservoir on the body member for containing a quick setting adhesive;

plunger means on the body member arranged with an end portion disposed to abut the substrate and cooperating with the reservoir for displacement thereinto as the vacuum cup is flattened; and the volume of the reservoir being reduced as the plunger means is displaced thereinto to expel adhesive in the reservoir into the interface between the body member and the substrate against which the vacuum cup is flattened.

11. The invention defined by claim 10 wherein distributing means are provided for receiving adhesive expelled from the reservoir and distributing it throughout said interface.

12. The invention defined by claim 11 wherein valve means is provided between the reservoir and said distributing means and responsive to displacement of the plunger means to allow escape of adhesive from the reservoir into the distributing means.

13. A vacuum fixed adhesively secured fastener for attachment to a substrate comprising, in combination:

a body member having a vacuum cup thereon for flattening against a substrate to temporarily hold the body member thereto and defining an interface therebetween;

said body member having therein an adhesive reservoir for containing a quick setting adhesive;

said reservoir having a wall portion for inward displacement as the vacuum cup is flattened against a substrate to pressurize adhesive in the reservoir;

said wall portion comprising a plunger having an end portion disposed for abutment against a substrate against which the vacuum cup is flattened; and valve means for controlling egress of adhesive from the reservoir and responsive to displacement of said wall portion for allowing escape of adhesive into the interface between the vacuum cup and a substrate against which the vacuum cup is flattened.

14. The invention defined by claim 13 wherein means are provided for receiving adhesive expelled from said reservoir and directing the adhesive in determined paths through the interface between the vacuum cup and a substrate against which the vacuum cup is flattened.

15. A vacuum fixed adhesively secured fastener for attachment to a substrate comprising, in combination:

a body member having a vacuum cup thereon for flattening against a substrate to temporarily hold the body member thereto and defining an interface therebetween;

said body member having therein an adhesive reservoir for containing a quick setting adhesive;

said reservoir having a wall portion for inward displacement as the vacuum cup is flattened against a substrate to pressurize adhesive in the reservoir; and said adhesive reservoir comprising a chamber member shiftably mounted in the body member and having an adhesive egress port adjacent the vacuum cup, said chamber member being shiftable between a first position in which said port is blocked and a second position in which it is open, and said chamber member being shiftable from the first to the second position during inward displacement of said wall portion to allow escape of adhesive into said interface.

16. A vacuum fixed adhesively secured fastener for attachment to a substrate comprising, in combination:

a body member having a vacuum cup thereon for flattening against a substrate to temporarily hold the body member thereto and defining an interface therebetween;

said body member having therein an adhesive reservoir for containing a quick setting adhesive;

said adhesive reservoir comprising a chamber open at one end facing the vacuum cup;

a plunger shiftably disposed in said open end and projecting through the vacuum cup and having a circumferential land disposed to block the opening when the plunger is disposed in a first position;

said plunger having an exit passage for discharging adhesive from the chamber when the plunger has been shifted to a second position; and said plunger having an end for abutting a substrate against which the vacuum cup is to be flattened and displacing the plunger form the first to the second position during such flattening.

17. The invention defined by claims 1, 13, 10, 2 or 15 wherein a quick setting adhesive is disposed in said reservoir.

* * * * *

UNITED STATES PATENT AND TRADEMARK OFFICE
CERTIFICATE OF CORRECTION

PATENT NO. : 5,044,852

DATED : September 3, 1991

INVENTOR(S) : Theodore J. Sweeney and Englebert A. Meyer

It is certified that error appears in the above-identified patent and that said Letters Patent is hereby corrected as shown below:

Column 3, line 39 delete "locks" and insert --blocks--.

Column 3, line 39 after "30a" insert --,--.

Column 3, line 41 after "2" add --,--.

Column 3, line 59 delete "plastic" and insert --plastics--.

Column 5, line 36 delete "is".

Column 8, line 42, claim 16 delete "form" and insert --from--.

Signed and Sealed this

Twenty-third Day of February, 1993

Attest:

STEPHEN G. KUNIN

*Attesting Officer*  *Acting Commissioner of Patents and Trademarks*

REEXAMINATION CERTIFICATE (2525th)

United States Patent [19]

Sweeney et al.

[11] B1 5,044,852

[45] Certificate Issued Apr. 4, 1995

[54] VACUUM FIXED ADHESIVELY SECURED FASTENER

[75] Inventors: Theodore J. Sweeney, Grosse Pointe City, Mich.; Englebert A. Meyer, Sun City, Calif.

[73] Assignee: Theodore Sweeney & Company, Inc., Detroit, Mich.

Reexamination Request:
No. 90/003,441, May 23, 1994

Reexamination Certificate for:
Patent No.: 5,044,852
Issued: Sep. 3, 1991
Appl. No.: 571,573
Filed: Feb. 18, 1988

Certificate of Correction issued Feb. 23, 1993.

[22] PCT Filed: Feb. 18, 1988

[86] PCT No.: PCT/US88/00499
§ 371 Date: Sep. 4, 1990
§ 102(e) Date: Sep. 4, 1990

[87] PCT Pub. No.: WO89/07718
PCT Pub. Date: Aug. 24, 1989

Related U.S. Application Data

[60] Continuation-in-part of Ser. No. 86,363, Aug. 17, 1987, Pat. No. 4,830,558, which is a division of Ser. No. 800,555, Nov. 21, 1985, Pat. No. 4,693,652, which is a continuation of Ser. No. 472,084, Mar. 4, 1983, Pat. No. 4,555,206, which is a division of Ser. No. 234,777, Feb. 11, 1981, Pat. No. 4,425,065, which is a division of Ser. No. 936,331, Aug. 24, 1978, abandoned.

[51] Int. Cl.$^6$ .................. F16B 39/00; F16B 37/06
[52] U.S. Cl. .................. 411/258; 411/82; 248/205.3
[58] Field of Search .................. 411/69, 82, 171, 258, 411/965; 405/259.5, 259.6; 156/71, 242, 295; 248/205.3

[56] References Cited

U.S. PATENT DOCUMENTS 1,859,893  5/1932  Ritz-Woller .
2,432,719  12/1947  Braun .

FOREIGN PATENT DOCUMENTS 8713953  2/1988  Germany .
44-5220  2/1969  Japan .
61-61318  4/1986  Japan .

*Primary Examiner*—Neill R. Wilson

[57] ABSTRACT

A vacuum fixed adhesively secured fastener comprises a body member (24) having a vacuum cup (26) for flattening against a substrate (22) to temporarily hold the body member (24) against the substrate (22). A reservoir (32) is adapted to contain a quick setting adhesive (30) which is expelled from the reservoir into the interface (28) between the substrate (22) and the body member as a plunger (45) displaced into the reservoir during flattening of the vacuum cup. The quick setting adhesive secures the body member (24) to the substrate (22).

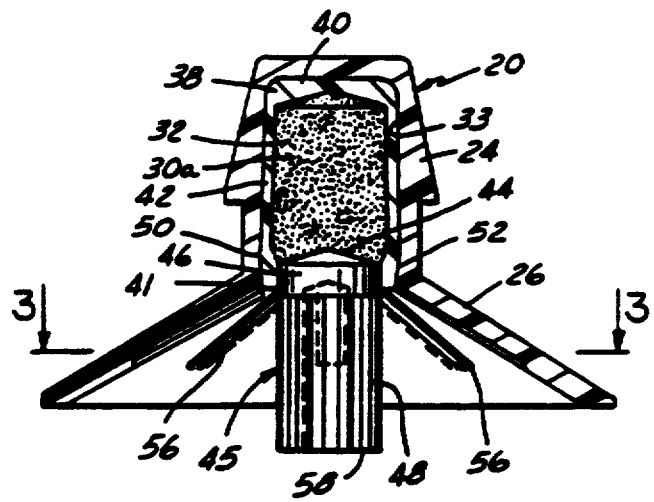

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5, 9, 15, 16 and 17 is confirmed.

Claims 1, 2, 10 and 13 are cancelled.

Claims 3, 4, 6, 7, 11 and 14 are determined to be patentable as amended.

Claims 8 and 12, dependent on an amended claim, are determined to be patentable.

New claims 18-23 are added and determined to be patentable.

3. The invention defined in claim [2] *19* characterized by valve means for controlling egress of adhesive from the reservoir into said interface.

4. The invention defined by claim [1 or 2] *18 or 19* characterized in that said valve means is responsive to displacement of said plunger means to allow egress of adhesive from the reservoir into the said interface.

6. The invention defined by claim [1] *18* wherein the end of the plunger means disposed to abut the substrate as the vacuum cup is flattened is disposed within the vacuum cup.

7. The invention defined by claim [1] *18* wherein said plunger means is arranged with an end portion exposed for depression in flattening the vacuum cup against a substrate.

11. The invention defined by claim [10] *20* wherein distributing means are provided for receiving adhesive expelled from the reservoir and distributing it throughout said interface.

14. The invention defined by claim [13] *21* wherein means are provided for receiving adhesive expelled from said reservoir and directing the adhesive in determined paths through the interface between the vacuum cup and a substrate against which the vacuum cup is flattened.

*18. A vacuum fixed adhesively secured fastener for attachment to a substrate comprising, in combination:*

*a body member having a vacuum cup thereon for flattening against a substrate to temporarily hold the body member thereto and defining an interface therebetween;*

*a reservoir on the body member for containing a quick setting adhesive;*

*plunger means on the body member cooperating with the reservoir for displacement thereinto as the vacuum cup is flattened;*

*valve means between the reservoir and the interface and responsive to displacement of the plunger means to allow escape of adhesive from the reservoir to said interface; and*

*the volume of the reservoir being reduced as the plunger means is displaced thereinto to expel adhesive in the reservoir into the interface between the body member and a substrate against which the vacuum cup is flattened, said plunger having sufficient volume relative to the volume of said reservoir to expel essentially all of the adhesive in said reservoir.*

*19. A vacuum fixed adhesively secured fastener for attachment to a substrate comprising, in combination:*

*a body member having a vacuum cup thereon for flattening against a substrate to temporarily hold the body member thereto and defining an interface therebetween;*

*said body member having therein an adhesive reservoir for containing a quick setting adhesive;*

*said reservoir having a wall portion for inward displacement as the vacuum cup is flattened against a substrate to pressurize adhesive in the reservoir;*

*said wall portion comprising a plunger having an outwardly disposed end portion to be displaced toward the reservoir as the vacuum cup is flattened against a substrate; and*

*valve means for controlling egress of adhesive from the reservoir and responsive to displacement of said wall portion for allowing escape of adhesive into the interface between the vacuum cup and a substrate against which the vacuum cup is flattened, said plunger having sufficient volume relative to the volume of said reservoir to expel essentially all of the adhesive in said reservoir.*

*20. A vacuum fixed adhesively secured fastener for attachment to a substrate comprising, in combination:*

*a body member having a vacuum cup thereon for flattening against a substrate to temporarily hold the body member thereto and defining an interface therebetween;*

*a reservoir on the body member for containing a quick setting adhesive;*

*plunger means on the body member arranged with an end portion disposed to abut the substrate and cooperating with the reservoir for displacement thereinto as the vacuum cup is flattened; and*

*the volume of the reservoir being reduced as the plunger means is displaced thereinto to expel adhesive in the reservoir into the interface between the body member and the substrate against which the vacuum cup is flattened, said plunger having sufficient volume relative to the volume of said reservoir to expel essentially all of the adhesive in said reservoir.*

*21. A vacuum fixed adhesively secured fastener for attachment to a substrate comprising, in combination:*

*a body member having a vacuum cup thereon for flattening against a substrate to temporarily hold the body member thereto and defining an interface therebetween;*

*said body member having therein an adhesive reservoir for containing a quick setting adhesive;*

*said reservoir having a wall portion for inward displacement as the vacuum cup is flattened against a substrate to pressurize adhesive in the reservoir;*

*said wall portion comprising a plunger having an end portion disposed for abutment against a substrate against which the vacuum cup is flattened; and*

*valve means for controlling egress of adhesive from the reservoir and responsive to displacement of said wall portion for allowing escape of adhesive into the inter-* face between the vacuum cup and a substrate against which the vacuum cup is flattened, said plunger having sufficient volume relative to the volume of said reservoir to expel essentially all of the adhesive in said reservoir.

22. A method for adhesively permanently securing a vacuum cup fastener to a substrate without piercing the substrate, comprising the steps of:

providing a reservoir in said fastener for containing a quick setting adhesive;

providing a quick setting adhesive of predetermined volume in said reservoir;

providing a plunger for movement with respect to said reservoir and of sufficient volume to expel essentially all of the predetermined volume of adhesive in said reservoir;

pressing the vacuum cup fastener against the substrate;

expelling essentially all of said quick setting adhesive throughout an interface between the fastener and the substrate by moving said plunger with respect to said reservoir; and temporarily holding the fastener to the substrate at said interface with the vacuum of the vacuum cup for a sufficient time to permit said adhesive to quick set, whereby to permanently attach the fastener to the substrate.

23. The invention defined by claims 18, 19, 20, 21 or 22 wherein the reservoir is formed of a material which will not cause a quick setting adhesive to set up.

* * * * *